US010558466B2

(12) United States Patent
Breternitz et al.

(10) Patent No.: US 10,558,466 B2
(45) Date of Patent: Feb. 11, 2020

(54) SYSTEM AND METHOD FOR PARALLELIZATION OF DATA PROCESSING IN A PROCESSOR

(71) Applicant: Advanced Micro Devices, Inc., Sunnyvale, CA (US)

(72) Inventors: Mauricio Breternitz, Austin, TX (US); Mayank Daga, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 889 days.

(21) Appl. No.: 15/191,257

(22) Filed: Jun. 23, 2016

(65) Prior Publication Data
US 2017/0371665 A1 Dec. 28, 2017

(51) Int. Cl.
*G06F 9/38* (2018.01)
(52) U.S. Cl.
CPC .................. *G06F 9/3887* (2013.01)
(58) Field of Classification Search
None
See application file for complete search history.

(56) References Cited

U.S. PATENT DOCUMENTS

| | | | | |
|---|---|---|---|---|
| 9,058,678 B1* | 6/2015 | Le Grand | ............ | G06T 15/005 |
| 2011/0057937 A1* | 3/2011 | Wu | ..................... | G06F 15/8023 345/505 |
| 2014/0359626 A1* | 12/2014 | Guedalia | ................. | G06F 9/466 718/101 |
| 2017/0140012 A1* | 5/2017 | Bortnikov | ............... | G06F 17/10 |

OTHER PUBLICATIONS

Kijsipongse et al., Dynamic Load Balancing on GPU Clusters for Large-scale K-Means Clustering, IEEE 2012, pp. 346-350 (Year: 2012).*
Farivar et al., A Parallel Implementation of K-Means Clustering on GPUs, Pdpta. vol. 13., No. 2., 2008, pp. 1-6 (Year: 2008).*
Li, et al., "Speeding up K-Means Algorithm by GPUs", Proceedings of the 2010 10th IEEE International Conference on Computer and Information Technology, Jun. 29, 2010, 23 pages, IEEE Computer Society, Washington, D.C., USA.

(Continued)

*Primary Examiner* — Alan Chen
(74) *Attorney, Agent, or Firm* — Meyertons Hood Kivlin Kowert and Goetzel PC; Rory D. Rankin

(57) ABSTRACT

Systems, apparatuses, and methods for adjusting group sizes to match a processor lane width are described. In early iterations of an algorithm, a processor partitions a dataset into groups of data points which are integer multiples of the processing lane width of the processor. For example, when performing a K-means clustering algorithm, the processor determines that a first plurality of data points belong to a first group during a given iteration. If the first plurality of data points is not an integer multiple of the number of processing lanes, then the processor reassigns a first number of data points from the first plurality of data points to one or more other groups. The processor then performs the next iteration with these first number of data points assigned to other groups even though the first number of data points actually meets the algorithmic criteria for belonging to the first group.

20 Claims, 12 Drawing Sheets

(56) References Cited

OTHER PUBLICATIONS

Rhu, et al., "Maximizing SIMD Resource Utilization in GPGPUs with SIMD Lane Permutation", Proceedings of the 40th Annual International Symposium on Computer Architecture, Jun. 23, 2013, 12 pages, ACM, New York, NY, USA.

Celebi, et al., "A Comparative Study of Efficient Initialization Methods for the K-Means Clustering Algorithm", Expert Systems with Applications, Jan. 2013, 17 pages, vol. 40, Issue 1.

\* cited by examiner

SYSTEM AND METHOD FOR PARALLELIZATION OF DATA PROCESSING IN A PROCESSOR

BACKGROUND

Description of the Related Art

Increasing computational capabilities and storage capacities have unleashed the field of large-scale data analytics which in turn has made machine learning (ML) a widespread phenomenon. ML is used in myriad of fields such as product recommendations, speech recognition, autonomous driving, and other fields. A number of ML algorithms proceed by successive iterative refinement of an input data set, which is partitioned according to certain classification objectives.

An example of a ML algorithm is the K-means clustering algorithm. The K-means algorithm partitions an input n-dimensional data set into a specified number of 'K' sets, with the data points closest according to a distance metric. The algorithm starts by choosing an initial set of 'K' centroids, and then the algorithm computes the Euclidean distance of the data points to the 'K' centroids. The iterative refinement step groups data points with the closest centroid. Next, the centroid of each group is updated based on the data points assigned to the group. The algorithm continues iterating until no further moves are required (i.e., no data point changes groups from one iteration to the next).

In some embodiments, ML algorithms are executed on graphics processing units (GPUs) or other types of parallel processors. GPUs are dedicated processors for processing computer graphics. Due to the large computing demands for high-definition graphics applications, GPUs have evolved into highly parallel processors with large numbers of compute units. Each compute unit of a GPU includes a plurality of processing lanes for executing a plurality of work-items in parallel. GPUs have also been used for general-purpose computing (GPGPU). In many applications executed on a GPU, a sequence of work-items, which can also be referred to as threads, are processed so as to output a final result. In many modern parallel processors, for example, processors may synchronously execute a set of work-items. Typically, the synchronous execution of work-items is identical (i.e., they execute same code instructions on different data). However, for a typical ML algorithm, the distribution of data may be such that the number of work-items may not match the number of processing lanes on the GPU (which in various embodiments is the GPU processor's lane width), resulting in an inefficient use of the GPU.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
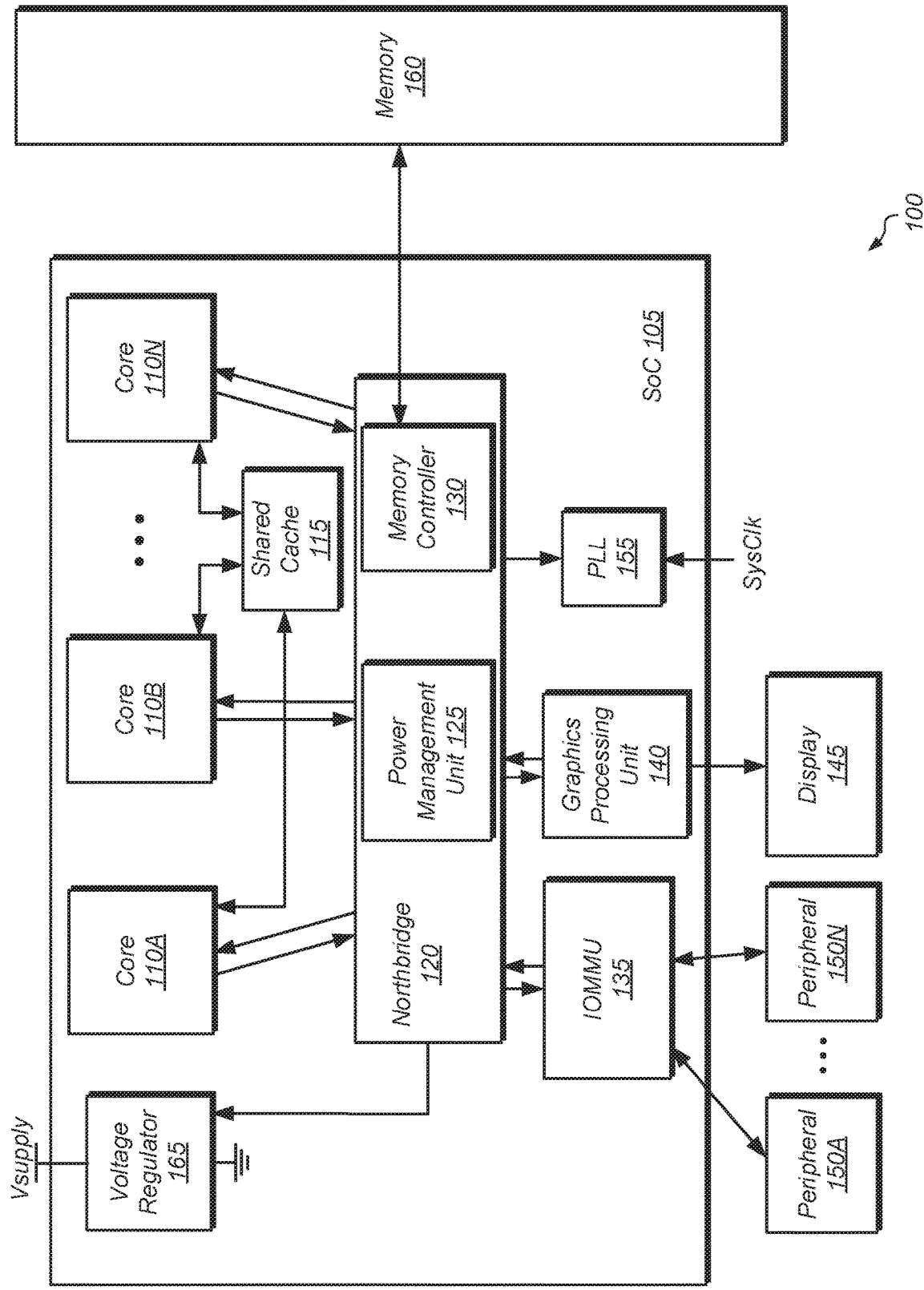
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for performing machine learning (ML) algorithms on computing systems including parallel processors are contemplated. In one embodiment, an apparatus includes a parallel processing unit with a plurality of processing lanes configured to execute work items in parallel. The parallel processing unit includes 'N' processing lanes, with 'N' being a positive integer greater than one. In some embodiments, the apparatus also includes one or more other processing units in addition to the parallel processing unit. For example, the apparatus is an accelerated processing unit (APU) which includes one or more central processing units (CPUs) and a graphics processing unit (GPU). The apparatus is configured to perform algorithms for use in many types of scenarios. For example, the apparatus performs ML algorithms in various fields, including the fields of product recommendations, speech recognition, autonomous driving, classification schemes, and other fields.

In one embodiment, the apparatus is configured to perform an iterative algorithm on an input dataset over a plurality of iterations. The input dataset includes a plurality of 'M' dimensional data points, with 'M' being a positive integer, and with 'M' varying from embodiment to embodiment. In one embodiment, the goal of the algorithm is to partition the plurality of data points into two or more groups based on specific criteria. For example, if the apparatus is implementing a K-means algorithm, then the plurality of data points is partitioned into groups that are closest to one of 'K' centroids. Then, a new set of 'K' centroids is calculated, with each new centroid calculated as the average of the previous centroid's group of data points. The algorithm is performed over a plurality of iterations until no data points move between centroids on successive iterations. In one embodiment, the early iterations of the algorithm are performed on the parallel processing unit while later iterations are performed on the CPU.

In each iteration of the K-means algorithm, the distance from each data point to each of the 'K' centroids is calculated. Next, the centroid to which a given data point is closest is identified. Then, the given data point is assigned to the group for that centroid. After the initial grouping, each centroid includes the data points which are closer to that particular centroid than any other centroid. Next, the apparatus is configured to adjust the groupings so as to maximize the number of groups which have an integer multiple of 'N' data points in the group, with 'N' being the number of processing lanes of the parallel processing unit. The apparatus reassigns data points among the centroids to achieve a more optimal grouping which matches the architecture of the parallel processing unit. For example, if the parallel processing unit has 64 processing lanes, and a first group has 65 data points, one of the data points from the first group is reassigned to a second group. After data points are reassigned among the centroids to achieve a more optimal grouping that matches the parallel processing unit architecture, new centroids are calculated based on taking an average of the data points assigned to each centroid. Then, after the new centroids have been calculated, a new iteration of the algorithm is performed. By reassigning data points to achieve a more efficient grouping to match the width of the parallel processing unit, the algorithm is performed in a more efficient manner tailored to the architecture.

As the algorithm is nearing convergence, the apparatus switches back to performing the algorithm in the traditional manner without the reassignment stage. Additionally, for apparatuses having a heterogeneous architecture of multiple different processing units, as the number of centroid moves falls below a threshold, the apparatus shifts from performing iterations on the parallel processing unit to performing iterations on the CPU.

In one embodiment, a system includes at least a parallel processing unit and a non-transitory computer readable medium. The non-transitory computer readable medium includes program instructions which are executable by the processor to reassign data points among groups to achieve a more optimal grouping that matches the parallel processing unit architecture. Additionally, in other embodiments, methods are performed for reassigning data points among groups to achieve a more optimal grouping that is better suited for the number of processing lanes of a parallel processing unit.

Referring now to FIG. 1, a block diagram of a computing system 100 in accordance with some embodiments is shown. In these embodiments, computing system 100 includes system on chip (SoC) 105 coupled to memory 160. SoC 105 may also be referred to as an integrated circuit (IC). In some embodiments, SoC 105 includes a plurality of processor cores 110A-N. In other embodiments, SoC 105 includes a single processor core 110. In multi-core embodiments, processor cores 110 are identical to each other (i.e., symmetrical multi-core), or one or more cores are different from others (i.e., asymmetric multi-core). Each processor core 110 includes one or more execution units, cache memories, schedulers, branch prediction circuits, and so forth. Furthermore, each of processor cores 110 is configured to assert requests for access to memory 160, which functions as main memory for computing system 100. Such requests include read requests and/or write requests, and are initially received from a respective processor core 110 by northbridge 120.

Input/output memory management unit (IOMMU) 135 is also coupled to northbridge 120 in the embodiment shown.

IOMMU 135 functions as a south bridge device in computing system 100. A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) are coupled to IOMMU 135. Various types of peripheral devices 150A-N are coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices 150A-N that are coupled to IOMMU 135 via a corresponding peripheral bus assert memory access requests using direct memory access (DMA). These requests (which include read and write requests) are conveyed to northbridge 120 via IOMMU 135.

In some embodiments, SoC 105 includes a graphics processing unit (GPU) 140 that is coupled to display 145 of computing system 100. In some embodiments, GPU 140 is an integrated circuit that is separate and distinct from SoC 105. Display 145 is a flat-panel LCD (liquid crystal display), plasma display, a light-emitting diode (LED) display, or any other suitable display type. GPU 140 performs various video processing functions and provide the processed information to display 145 for output as visual information. GPU 140 is also configured to perform other types of tasks scheduled to GPU 140 by an application scheduler. GPU 140 includes a number 'N' of processing lanes for executing work items of various applications or processes, with 'N' a positive integer greater than one. In one embodiment, each processing lane includes an arithmetic logic unit for executing integer or floating-point instructions.

In various embodiments, SoC 105 is configured to perform any of various machine learning algorithms. Prior art implementations of machine learning algorithms do not factor in architectural considerations when partitioning a dataset during iterations of the algorithm. However, SoC 105 is configured to modify and optimize machine learning algorithms to better match the architecture of GPU 140 and cores 110A-N. In one embodiment, a K-means clustering algorithm is implemented by SoC 105. The K-means clustering algorithm is utilized in any of various scenarios. For example, a catalog of movies is grouped into different categories (e.g., romance, drama, comedy) using the K-means algorithm. In another example, an inventory of different products is classified into different product categories (e.g., electronics, houseware) using the K-means algorithm. The K-means algorithm is also utilized for generating other types of solutions.

When implementing a K-means clustering algorithm, a dataset is partitioned into groups of data points around centroids based on a proximity of the data points to the centroids. SoC 105 is configured to adjust the groupings so as to maximize the number of groups which have an integer multiple of 'N' data points in the group, with 'N' being the number of processing lanes of GPU 140. SoC 105 reassigns data points among the centroids to achieve a more optimal grouping which matches the architecture of GPU 140.

In one embodiment, memory controller 130 is integrated into northbridge 120. In other embodiments, memory controller 130 is separate from northbridge 120. Memory controller 130 receives memory requests conveyed from northbridge 120. Data accessed from memory 160 responsive to a read request is conveyed by memory controller 130 to the requesting agent via northbridge 120. Responsive to a write request, memory controller 130 receives both the request and the data to be written from the requesting agent via northbridge 120. If multiple memory access requests are pending at a given time, memory controller 130 arbitrates between these requests.

In some embodiments, memory 160 includes a plurality of memory modules. Each of the memory modules includes one or more memory devices (e.g., memory chips) mounted thereon. In some embodiments, memory 160 includes one or more memory devices mounted on a motherboard or other carrier upon which SoC 105 is also mounted. In some embodiments, at least a portion of memory 160 is implemented on the die of SoC 105 itself. Embodiments having a combination of the aforementioned embodiments are also possible and contemplated. Memory 160 is used to implement a random access memory (RAM) for use with SoC 105 during operation. The RAM implemented is static RAM (SRAM) or dynamic RAM (DRAM). The type of DRAM that is used to implement memory 160 includes (but are not limited to) double data rate (DDR) DRAM, DDR2 DRAM, DDR3 DRAM, and so forth.

Although not explicitly shown in FIG. 1, SoC 105 also includes one or more cache memories that are internal to the processor cores 110. For example, each of the processor cores 110 includes an L1 data cache and an L1 instruction cache. In some embodiments, SoC 105 includes a shared cache 115 that is shared by the processor cores 110. In some embodiments, shared cache 115 is an L2 cache. In some embodiments, each of processor cores 110 has an L2 cache implemented therein, and thus shared cache 115 is an L3 cache. Cache 115 is part of a cache subsystem including a cache controller.

In one embodiment, power management unit 125 is integrated into northbridge 120. Power management unit 125 is configured to manage the power states of the various processing units of SoC 105. In one embodiment, power management unit 125 uses dynamic voltage and frequency scaling (DVFS) to change the frequency and/or voltage of a processing unit to limit the processing unit's power consumption to a chosen power allocation. In one embodiment, SoC 105 includes a phase-locked loop (PLL) unit 155 coupled to receive a system clock signal. PLL unit 155 includes a number of PLLs configured to generate and distribute corresponding clock signals to each of processor cores 110 and to other components of SoC 105. In the embodiment shown, SoC 105 also includes voltage regulator 165. Voltage regulator 165 provides a supply voltage to each of processor cores 110 and to other components of SoC 105. In some embodiments, voltage regulator 165 provides a supply voltage that is variable according to a particular operating point.

In various embodiments, computing system 100 is a computer, laptop, mobile device, server, web server, cloud computing server, storage system, or other types of computing systems or devices. It is noted that the number of components of computing system 100 can vary from embodiment to embodiment. There can be more or fewer of each component/subcomponent than the number shown in FIG. 1. It is also noted that computing system 100 includes many other components not shown in FIG. 1.

Figure 2:
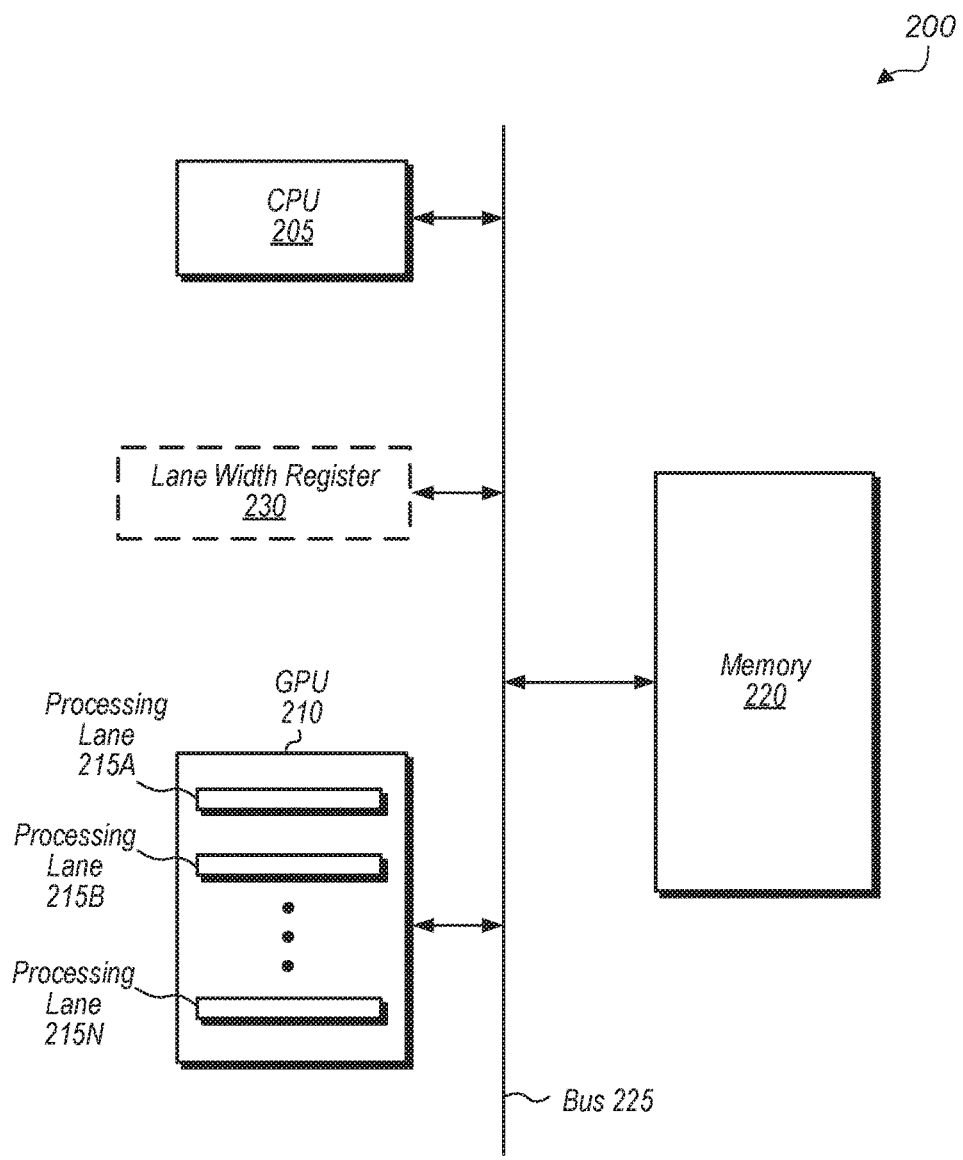
FIG. 2 is a block diagram of one embodiment of a computing system.

Turning now to FIG. 2, a block diagram of one embodiment of a computing system 200 is shown. System 200 includes at least CPU 205, GPU 210, memory 220, bus 225, and lane width register 230. In some embodiments, system 200 includes more than one CPU 205. CPU 205 is configured to execute instructions, applications, and other software instructions. CPU 205 has any number of cores, depending on the embodiment. In one embodiment, system 200 is an accelerated processing unit.

GPU 210 includes processing lanes 215A-N, which are representative of any number of parallel processing lanes for executing instructions and/or performing computations in parallel. Each processing lane 215A-N includes an arithmetic logic unit and be configured to process an instruction and data independently of the other lanes. In one embodiment, GPU 210 includes one or more single instruction multiple data (SIMD) units, with a first portion of processing lanes 215A-N part of a first SIMD unit, a second portion of processing lanes 215A-N part of a second SIMD unit, and so on.

CPU 205 is coupled to GPU 210 via bus 225, which is representative of any number and types of communication buses. CPU 205 and GPU 210 are also coupled to memory 220 and lane width register 230 via bus 225. Bus 225 is any type of communication infrastructure used in computer systems, including a peripheral component interface (PCI) bus, a memory bus, a PCI Express (PCIE) bus, front-side bus (FSB), hypertransport (HT), or another type of communication structure or communications channel.

Memory 220 is representative of any number and type of memory devices. Memory 220 stores data and instructions for execution by CPU 205 and/or GPU 210. Each of CPU 205 and GPU 210 also include one or more caches for storing data and instructions. In some embodiments, a shared cache (not shown) is coupled to CPU 205 and GPU 210 via bus 225. Any number of cache levels and memory devices are included within the memory hierarchy of system 200. Depending on the embodiment, lane width register 230 is part of CPU 205, GPU 210, or is independent of CPU 205 and GPU 210. Lane width register 230 stores the number 'N' of processing lanes in GPU 210. In one embodiment, software executing on system 200 accesses register 230 to determine the lane width. The software then optimizes an implementation of an algorithm according to the lane width to maximize the efficiency of executing on GPU 210.

In one embodiment, system 200 is configured to perform an iterative algorithm on an input dataset using CPU 205 and/or GPU 210. The input dataset includes a plurality of data points of any number of dimensions. In the early iterations of the algorithm, system 200 utilizes GPU 210 for processing data associated with the algorithm. During these early iterations, system 200 partitions the data points into groups that have a number of data points equal to an integer multiple of 'N', with 'N' the number of parallel processing lanes 215 in GPU 210. This will allow the early iterations to be performed more efficiently on GPU 210. System 200 attempts to create as many groups as possible that are integer multiples of 'N' or are relatively close to being integer multiples of 'N'. For example, in one embodiment, 'N' is equal to 64, and system 200 attempts to make the number of data points in each group equal to 64 or as near as possible to 64. For example, if a first group has 65 data points, then system 200 reassigns one of the data points to another group. If a second group has 63 data points, then system 200 reassigns a data point from the first group to the second group. Then, after the reassignment of the data point, the first group and second group will each have 64 data points, and the next iteration of the algorithm will execute more efficiently on GPU 210. In another embodiment, for a first group with 65 data points, the system 200 drops or ignores one of the data points for the next portion of the algorithm rather than assigning the data point to another group. The system 200 brings back the ignored data point on the subsequent iteration of the algorithm when system 200 calculates distances of all of the data points of the dataset to the new centroids.

As the algorithm nears convergence, system 200 shifts from GPU 210 to CPU 205 for performing the final iterations of the algorithm. GPU 210 and CPU 205 shares a unified memory space using memory 220, and so the overhead of reorganizing data when switching execution platforms from GPU 210 to CPU 205 is reduced. In some embodiments, CPU 205 includes a number of cores, and the system optimizes the partitions of groups to match the number of cores of CPU 205. When the number of moves falls below a threshold or when the number of iterations equals a predetermined number, then the algorithm terminates.

It is noted that system 200 is intended to represent one example of a system which implements the methods and mechanisms described herein. It should be understood that in other embodiments, system 200 includes one or more other components not shown in FIG. 2, omit one or more components shown in FIG. 2, and/or be arranged differently.

Figure 3:
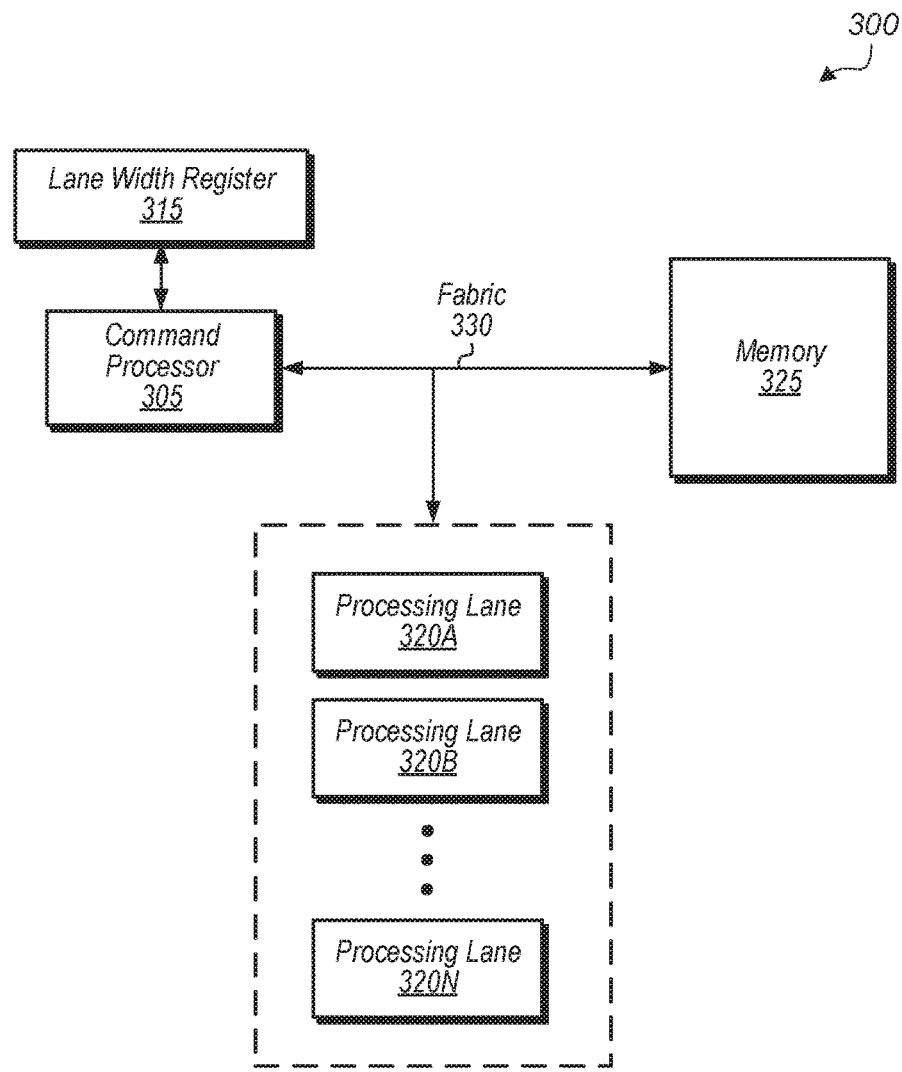
FIG. 3 illustrates one embodiment of a GPU.

Referring now to FIG. 3, a block diagram of one embodiment of a GPU 300 is shown. In one embodiment, GPU 300 includes at least command processor 305, processing lanes 320A-N, lane width register 315, memory 325, and communication fabric 330. Command processor 305 includes or be coupled to lane width register 315, allowing software executing on command processor 305 to determine the number of processing lanes in GPU 300. Command processor 305 is also coupled to processor lanes 320A-N and memory 325 via fabric 330. Memory 325 is representative of any number and type of memory devices.

In one embodiment, GPU 300 is connected to a CPU (not shown) to process various tasks related to parallel processing. In another embodiment, GPU 300 is a general purpose GPU (GPGPU) either performing a plurality of different tasks as a co-processor of a CPU or performing the functions of the CPU. Command processor 305 includes the functionality to coordinate the functions of GPU 300. For example, in one embodiment, command processor 305 receives instructions from a CPU and issue corresponding instructions for processing by the processing lanes 320A-N. Memory 325 includes data and/or instructions for use by command processor 305 and processing lanes 320A-N.

GPU 300 is configured to perform an iterative algorithm on an input dataset in an efficient, parallel fashion on processing lanes 320A-N. Processing lanes 320A-N are representative of any number of processing lanes, with the number varying from embodiment to embodiment. Each processing lane 320A-N is configured to execute one or more concurrent threads, each thread performing a part of the processing for one or more tasks assigned to the processing lanes 320A-N. Each processing lane 320A-N is configured to execute threads concurrently with the other processing lanes so as to efficiently execute parallel processing applications.

The iterative algorithm performed on GPU 300 is modified to take into account the number of processing lanes 320A-N. In one embodiment, a plurality of data points of the input dataset is partitioned into groups of data points which are integer multiples of the number of processing lanes 320A-N. This allows for more efficient processing of the algorithm on GPU 300. Then, after the algorithm has started to converge, the partitioning of data points is performed in the regular fashion to allow the final solution to be generated as intended by the algorithm.

Figure 4:
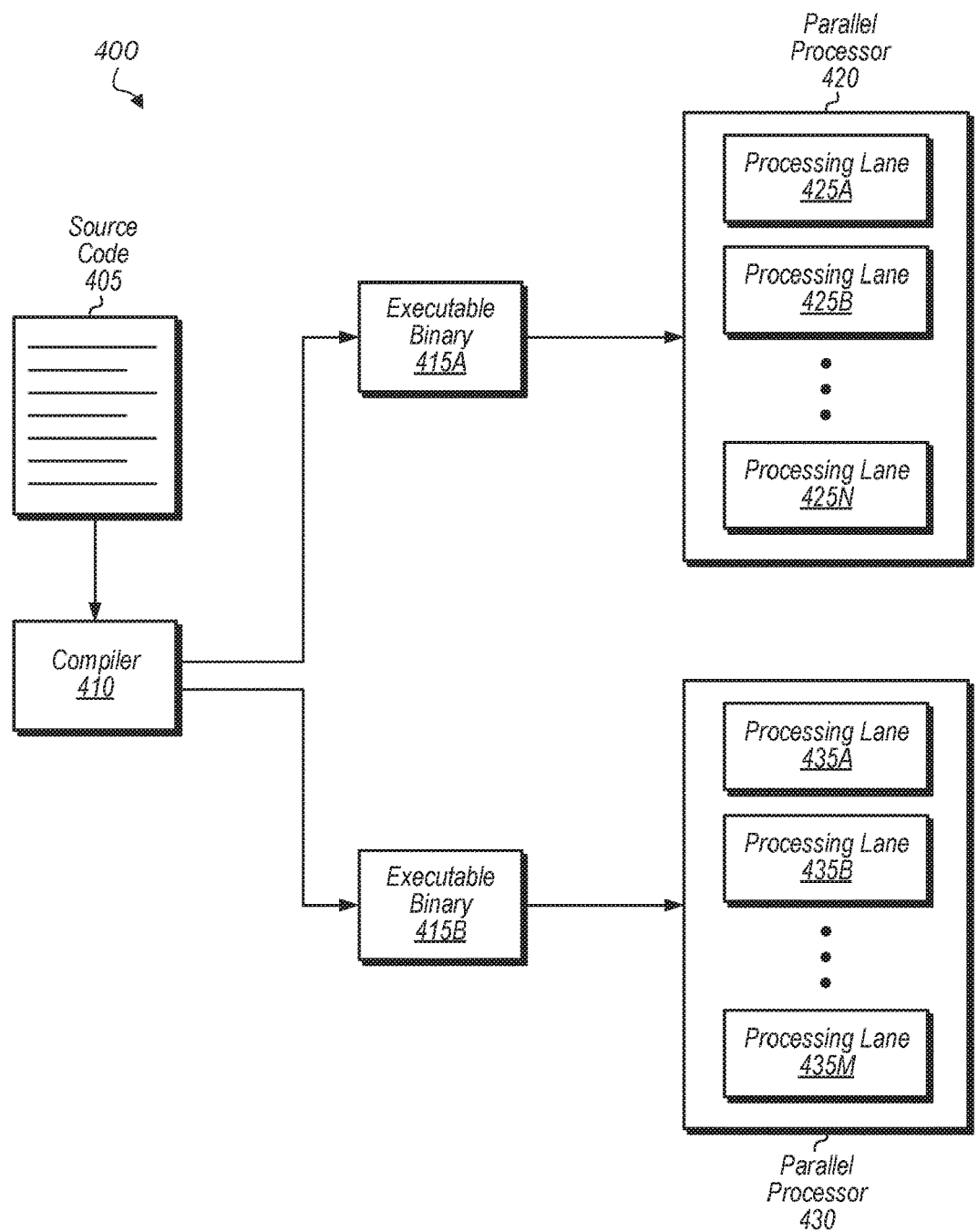
FIG. 4 illustrates one embodiment of a system for performing an iterative algorithm on multiple target platforms.

Turning now to FIG. 4, a block diagram of one embodiment of a system 400 for performing an iterative algorithm on multiple target platforms is shown. Source code 405 includes instructions of a program and source code 405 is written in any of various programming languages (e.g., C, C++, assembly, Verilog, VHDL). Source code 405 includes instructions to execute an iterative algorithm in an efficient manner by taking advantage of the specific architecture of a target parallel processor. In one embodiment, the instructions of source code 405 do not have knowledge of the specific architecture of the target parallel processor, and compiler 410 analyzes source code 405 and uses knowledge of the specific architecture of the target parallel processor to modify and/or add instructions to source code 405 to generate an executable binary that will efficiently take advantage of the number of processing lanes in the target parallel processor.

In one embodiment, compiler 410 analyzes and processes source code 405 to generate executable binary 415A targeting parallel processor 420 with a total of 'N' processing lanes 425A-N. The number 'N' is any positive integer greater than one. Compiler 410 generates executable binary 415A to be optimized for the 'N' processing lanes 425A-N of parallel processor 420. For example, executable binary 415A is configured to partition an input dataset into groups of data points which are as close as possible to integer multiples of 'N'. The groups of data points are optimized to have slightly less than an integer multiple of 'N' rather than having slightly more than an integer multiple of 'N'. For example, if 'N' is 64, then it is preferable to have 63 data points rather than 65 data points in a given group. With 63 data points, 63 of the 64 processing lanes are utilized in one cycle, while 65 data points would use all 64 processing lanes in a first cycle and then only a single processing lane in a second cycle with the other 63 processing lanes sitting unused during the second cycle.

In another embodiment, compiler 410 analyzes and processes source code 405 to generate executable binary 415B targeting parallel processor 430 with a total of 'M' processing lanes 435A-M. The number 'M' is any positive integer greater than one, and the number 'M' is different from the number 'N'. Compiler 410 generates executable binary 415B to be optimized for the 'M' processing lanes 435A-M of parallel processor 430. For example, executable binary 415B is configured to partition an input dataset into groups of data points which are as close as possible to integer multiples of 'M'.

It is noted that compiler 410 generates any number of different executable binaries from source code 405, with the executable binaries targeting parallel processors with different numbers of processing lanes. In some embodiments, the compiler that is used to generate executable binary 415B is different from the compiler used to generate executable binary 415A. In this embodiment, a different compiler is utilized for each different parallel processer.

Figure 5:
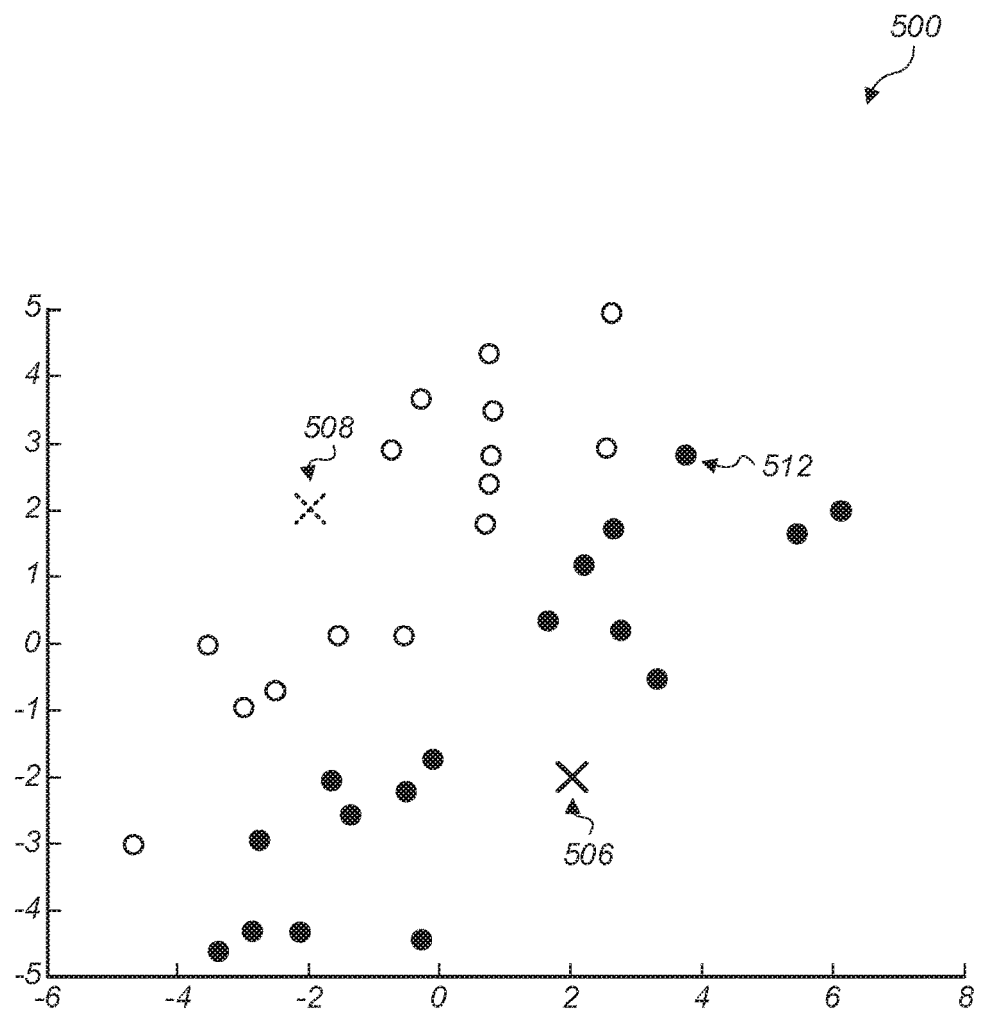
FIG. 5 illustrates one embodiment of data points during an iteration of a K-means clustering algorithm.

Referring now to FIG. 5, one embodiment of a graph 500 illustrating the data points during an iteration of a K-means clustering algorithm is shown. Graph 500 illustrates one example of a K-means clustering algorithm with 'K' equal to two in this example. The dataset in this example includes 32 data points, but a dataset includes any number of data points depending on the embodiment.

As part of implementing the K-means algorithm, the distance from each data point in the dataset to the different 'K' centroids is calculated. For example, for a first data point, the distance to the first centroid is calculated, the distance to the second centroid is calculated, and so on, until the distance to the Kth centroid is calculated. These distances are calculated for all of the data points of the dataset. In the example shown in graph 500, 'K' is equal to two and the two centroids 506 and 508 are shown as X's, with centroid 508 shown as a dashed X.

In the example shown in graph 500, there are 17 data points which are closest to centroid 506 and 15 data points which are closest to centroid 508. The 17 data points closest to centroid 506 are shown as filled (i.e., black) circles while the 15 data points closest to centroid 508 are shown as empty (i.e., white) circles. For the purposes of this discussion, it will be assumed that the parallel processor performing the algorithm has 16 processing lanes. Therefore, the software executing on the system or apparatus which includes this parallel processor repartitions the data points between the groups corresponding to centroid 506 and centroid 508 to match the number of processing lanes of the parallel processor. Accordingly, a data point assigned to centroid 506 is reassigned to centroid 508, even though the data point is actually closer to centroid 506. In the example illustrated in graph 500, data point 512 is chosen to be reassigned to centroid 508, although any of the other filled data points could be chosen. Reassigning data point 512 to centroid 508 will introduce an error into the K-means clustering algorithm for this iteration. However, the K-means clustering algorithm can survive errors in early iterations and still converge to a solution after all of the iterations are finished. This is a property of a variety of algorithms commonly utilized in data analytics and machine learning. In some embodiments, the software executing on the system or apparatus utilizes different techniques for determining which data point(s) to reassign to other groups based on characteristics of the data point(s). In one embodiment, the data point(s) which are reassigned are those data point(s) that are in closest proximity to the centroid to which they are being reassigned. In other embodiments, the data point(s) which are reassigned are randomly chosen.

Figure 6:
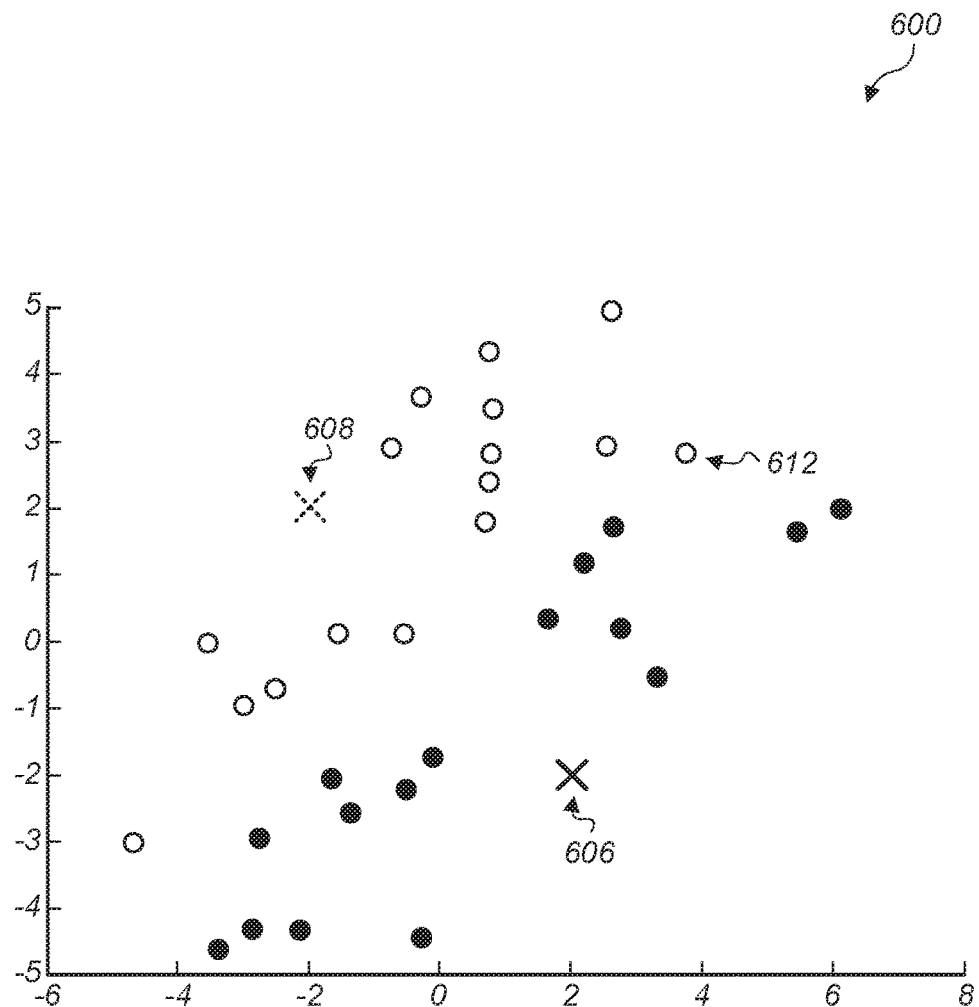
FIG. 6 illustrates one embodiment of data points during an iteration of a K-means clustering algorithm.

Turning now to FIG. 6, one embodiment of a graph 600 illustrating the data points during an iteration of a K-means clustering algorithm is shown. Graph 600 is intended to represent graph 500 (of FIG. 5) at a later point in time after data point 612 has been reassigned to the group corresponding to centroid 608. Also, centroid 606, centroid 608, and data point 612 are intended to represent centroid 506, centroid 508, and data point 512 (of FIG. 5), respectively, after data point 612 has been reassigned to the group corresponding to centroid 608.

After data point 612 has been reassigned to the group corresponding to centroid 608, each group of data points now includes 16 data points. As was previously mentioned, it should be assumed for the purposes of this discussion that the parallel processor performing the K-means algorithm has 16 processing lanes. Therefore, the new grouping of data points is an optimal grouping for the 16-lane parallel processor. The next iteration of the algorithm is now performed much more efficiently with the number of data points in each group matching the number of lanes of the parallel processor.

Figure 7:
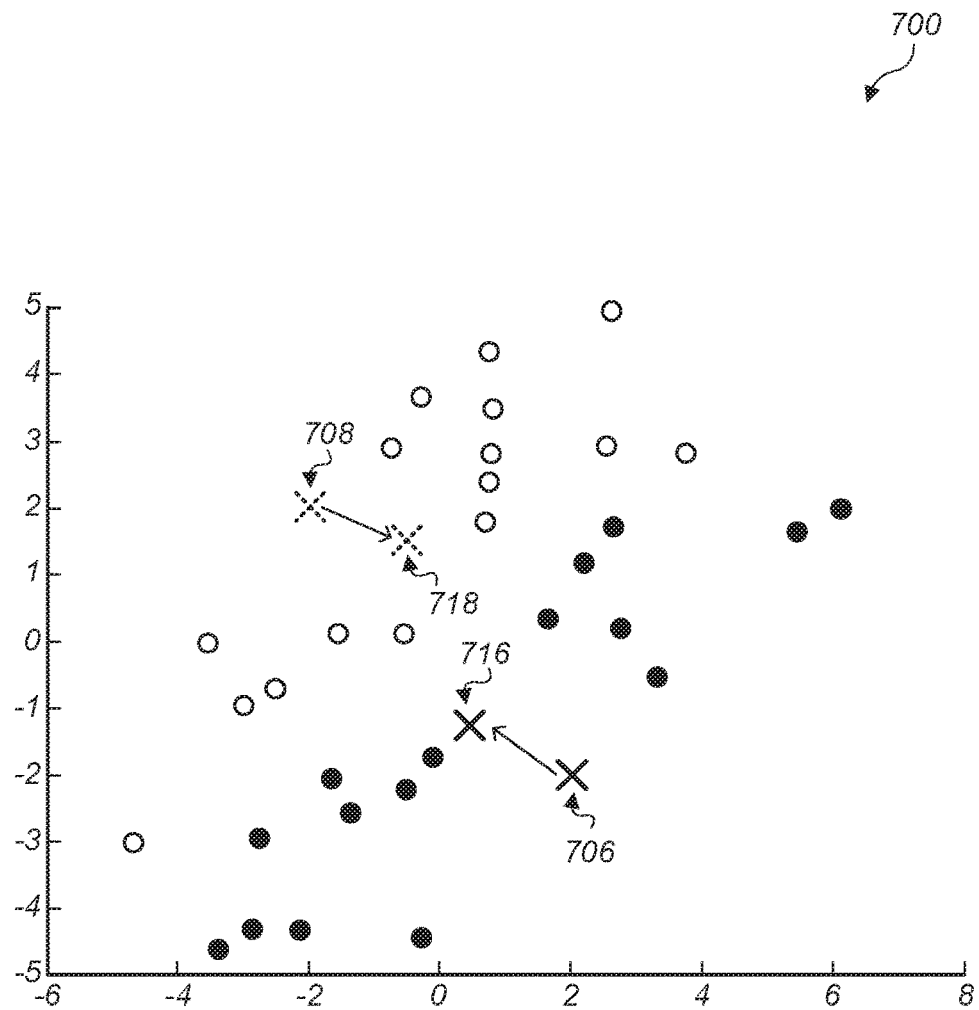
FIG. 7 illustrates one embodiment of data points during an iteration of a K-means clustering algorithm.

Referring now to FIG. 7, one embodiment of a graph 700 illustrating the data points during an iteration of a K-means clustering algorithm is shown. Graph 700 is intended to represent graph 600 (of FIG. 6) at a later point in time after new centroids 716 and 718 have been calculated based on the data points assigned to their groups. After data points are partitioned into groups according to the centroid to which they are closest, and after any reassignment of data points between groups to match the lane width of the parallel processor, new centroids are calculated based on an average of the data points assigned to the centroid.

As shown in graph 700, centroid 718 is the new centroid for the group of data points represented as unfilled circles. An arrow is shown pointing from previous centroid 708 to the newly calculated centroid 718. Centroid 716 is the new centroid for the group of data points represented as filled circles. An arrow is shown pointing from previous centroid 706 to the newly calculated centroid 716. The calculation of new centroids 716 and 718 is performed efficiently on the 16-lane parallel processor because of the previous reassignment of data point 612 (of FIG. 6) between groups. Accordingly, the calculations performed for determining the locations of new centroids 716 and 718 are performed on groups of 16 data points, which is an optimal grouping to match the 16 lanes of the target parallel processor.

After new centroids 716 and 718 are calculated, the next iteration of the algorithm is performed. During the next iteration, the distances between the data points and centroids 716 and 718 are calculated, and then the data points are partitioned into a first group which are closest to centroid 716 and a second group which are closest to centroid 718. Then, an extra partitioning step is performed to make the groups match the parallel processing lane number. These iterations continue until the solution starts to converge, and then the extra partitioning step is omitted to allow the solution to reach its final convergence. It is noted that the same partitioning scheme is utilized in other types of algorithms in addition to the K-means clustering algorithm. Accordingly, the methods and mechanisms described herein are not limited to the K-means clustering algorithm and are utilized with any number of other iterative algorithms for use in machine learning applications and other types of applications.

Figure 8:
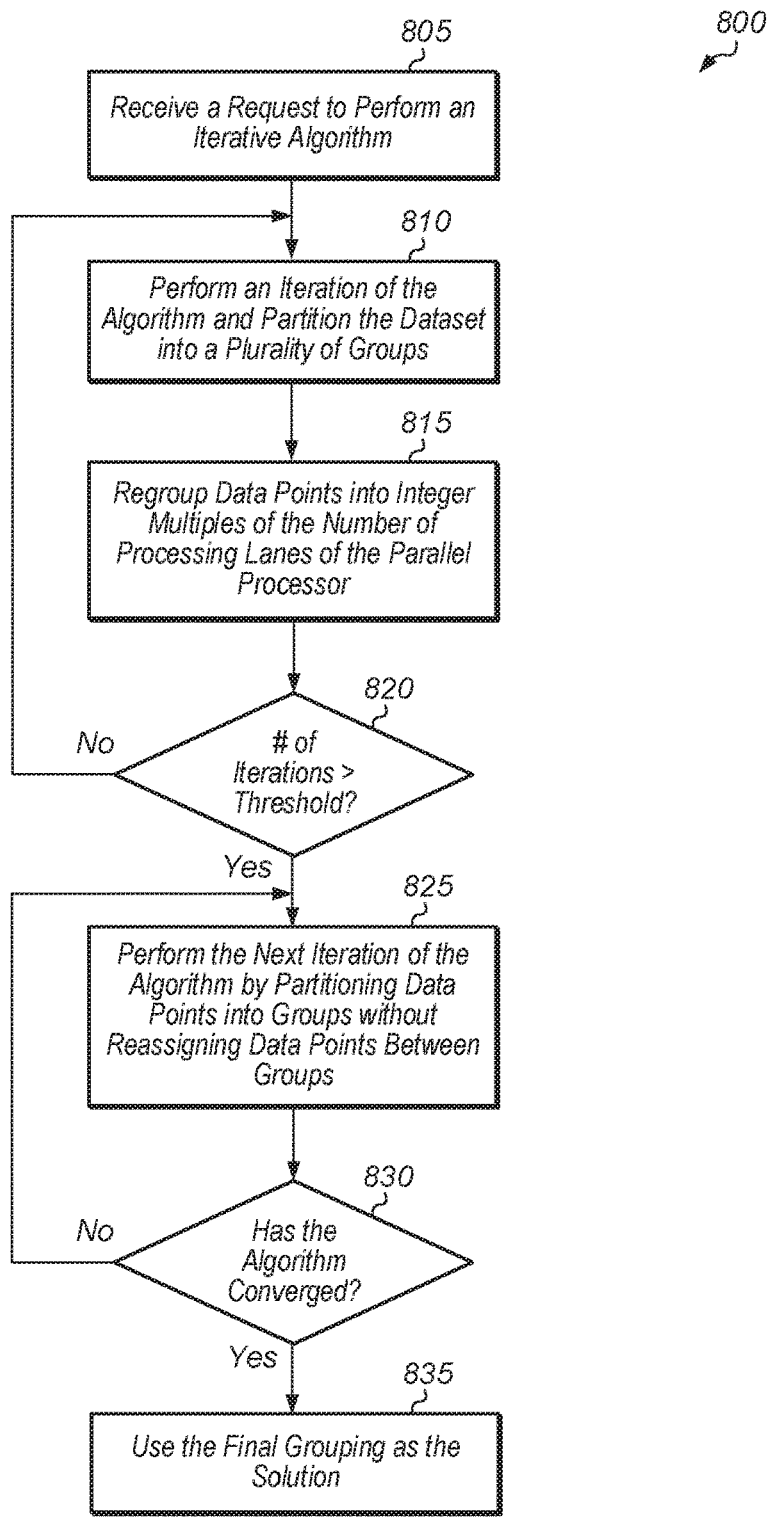
FIG. 8 is a generalized flow diagram illustrating one embodiment of a method for performing an iterative algorithm in an efficient manner.

Turning now to FIG. 8, one embodiment of a method 800 for performing an iterative algorithm in an efficient manner is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 800.

A processor receives a request to perform an iterative algorithm (block 805). The request includes or identify a dataset of a plurality of data points to be processed. In one embodiment, the iterative algorithm is a K-means clustering algorithm. In other embodiments, the iterative algorithm is any of various other types of algorithms (e.g., logistic regression algorithms, stochastic gradient descent (SGD) algorithms). The processor is part of an apparatus or system, depending on the embodiment. The system or apparatus includes a parallel processor with a plurality of processing lanes which execute instructions and/or perform computations in parallel. In one embodiment, the parallel processor is a GPU. In another embodiment, the parallel processor is a field programmable gate arrays (FPGA). In other embodiments, the parallel processor is other types of processing units (e.g., application specific integrated circuit (ASIC)). In some embodiments, the apparatus includes one or more CPUs in addition to the parallel processor.

Next, the processor performs an iteration of the algorithm and partition the dataset into a plurality of groups (block 810). Then, the processor regroups data points into integer multiples of the number of processing lanes of the parallel processor (block 815). As part of regrouping the data points into integer multiples of the number of processing lanes of the parallel processor, the processor reassigns data points which are in excess of the integer multiple to other groups.

Then, the processor determines if the number of iterations that have been performed is greater than a threshold (conditional block 820). If a threshold number of iterations have been performed (conditional block 820, "yes" leg), then the processor performs the next iteration of the algorithm by partitioning data points into groups without reassigning data points between groups (block 825). If a threshold number of iterations have not been performed (conditional block 820, "no" leg), then method 800 returns to block 810 and performs the next iteration of the algorithm by grouping data points into integer multiples of the processing lane number.

After block 825, the processor determines if the algorithm has converged (conditional block 830). In one embodiment, the processor determines that the algorithm has converged if the number of moves of data points to different groups has fallen below a threshold. In another embodiment, the processor determines that the algorithm has converged if the number of iterations has reached a predetermined threshold. In other embodiments, the processor utilizes other techniques for determining if the algorithm has converged. If the algorithm has converged (conditional block 830, "yes" leg), then the final grouping is used as the solution (block 835). After block 835, method 800 ends. If the algorithm has not converged (conditional block 830, "no" leg), then method 800 returns to block 825.

Figure 9:
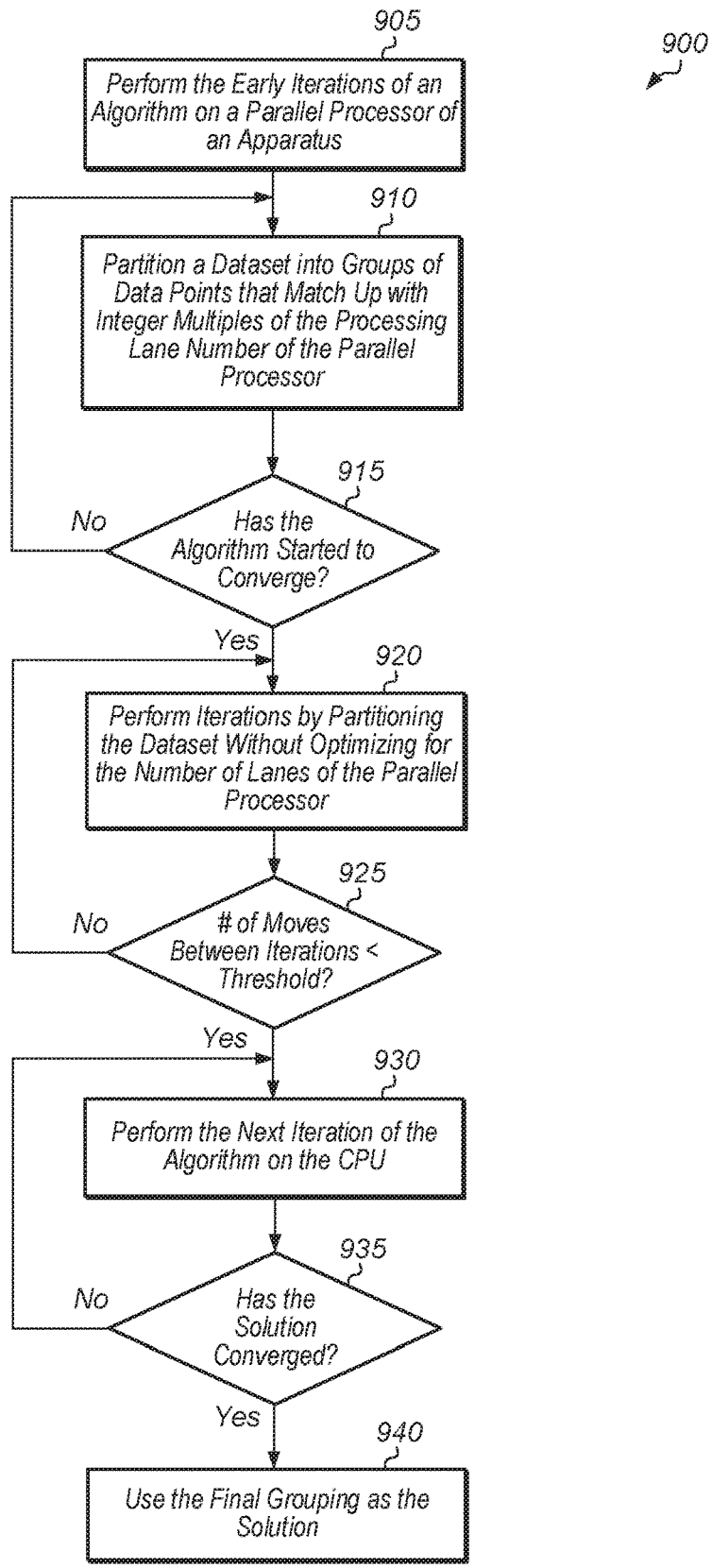
FIG. 9 is a generalized flow diagram illustrating one embodiment of a method for efficiently performing an iterative algorithm using a GPU and CPU.

Referring now to FIG. 9, one embodiment of a method 900 for efficiently performing an iterative algorithm using a GPU and CPU is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 900.

The early iterations of an algorithm are performed on a parallel processor of an apparatus (block 905). The parallel processor has 'N' separate processing lanes for simultaneously performing work items, with 'N' being a positive integer which is greater than one. In one embodiment, the parallel processor is a GPU. The apparatus also includes a CPU and one or more other components (e.g., memory, northbridge, memory controller, IOMMU). During the early iterations of the algorithm, the apparatus partitions a dataset into groups of data points that match up with integer multiples of the processing lane number of the parallel processor (block 910). In one embodiment, the apparatus introduces errors into the algorithm so as to cause the groups to include numbers of data points which are integer multiples of the number of processing lanes of the parallel processor.

Next, the apparatus determines if the algorithm has started to converge (conditional block 915). Depending on the embodiment, the apparatus utilizes different mechanisms to determine if the algorithm has started to converge. For example, in one embodiment, the apparatus determines that the algorithm has started to converge if a predetermined number of iterations have been performed. In another embodiment, the apparatus determines that the algorithm has started to converge if the number of moves of data points to different centroids on successive iterations has fallen below a threshold. In other embodiments, the apparatus utilizes other mechanisms for determining whether the algorithm has started to converge.

If the apparatus determines that the algorithm has started to converge (conditional block 915, "yes" leg), then the apparatus performs iterations by partitioning the dataset without optimizing for the number of lanes of the parallel processor (block 920). If the apparatus determines that the algorithm has not started to converge (conditional block 915, "no" leg), then method 900 returns to block 910.

After block 920, the apparatus determines if the number of moves of data points from centroid to centroid between iterations has fallen below a threshold (conditional block 925). If the number of moves between iterations has fallen below a threshold (conditional block 925, "yes" leg), then the apparatus performs the next iteration of the algorithm on the CPU (block 930). If the number of moves between iterations has not fallen below a threshold (conditional block 925, "no" leg), then method 900 returns to block 920.

After block 930, the apparatus determines if the solution has converged (conditional block 935). If the solution has converged (conditional block 935, "yes" leg), then the final grouping is utilized as the solution (block 940). After block 940, method 900 ends. If the solution has not converged (conditional block 935, "no" leg), then method 900 returns to block 930.

Figure 10:
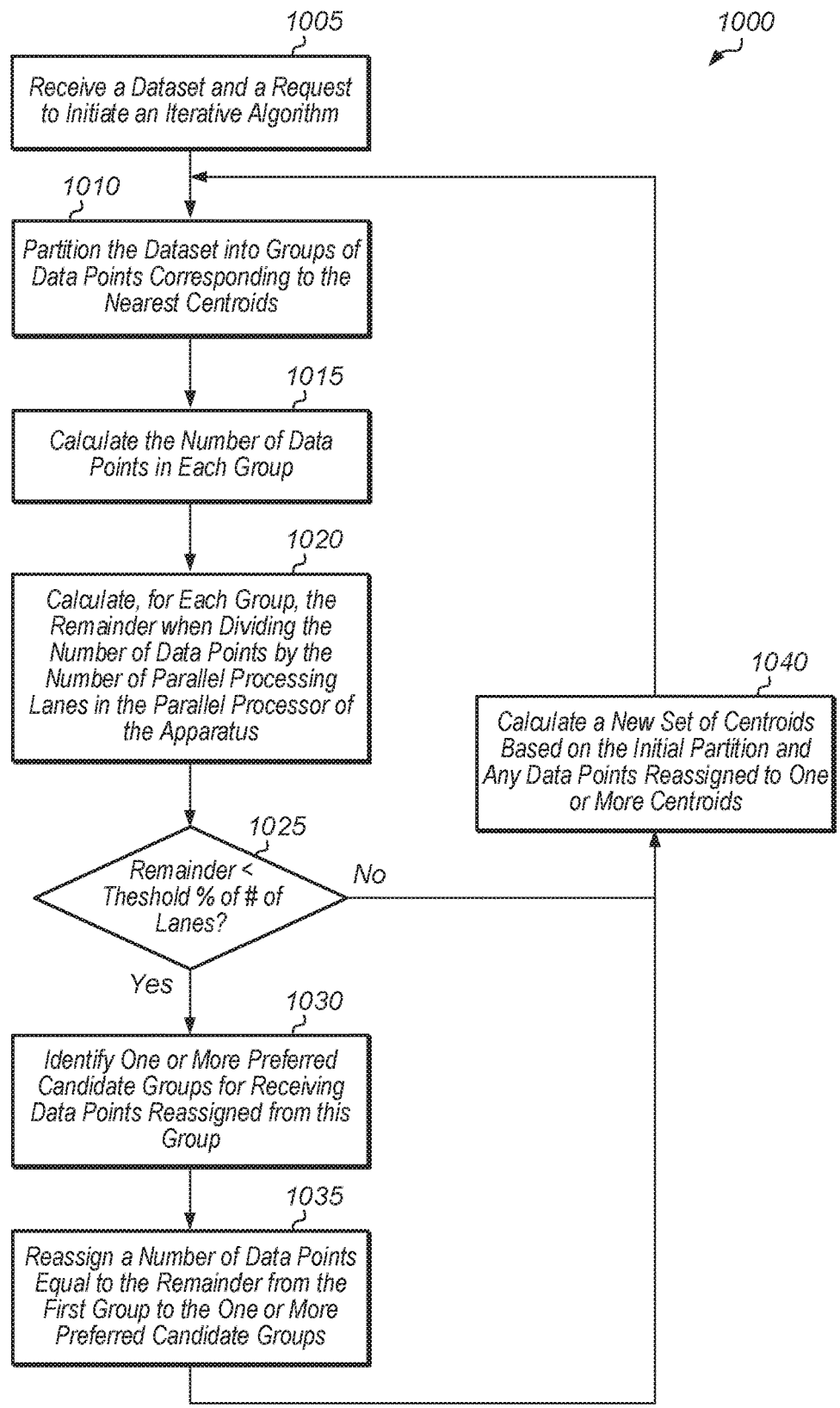
FIG. 10 is a generalized flow diagram illustrating one embodiment of a method for partitioning data groups to match the parallel processing lane number.

Turning now to FIG. 10, one embodiment of a method 1000 for partitioning data groups to match the parallel processing lane number is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1000.

An apparatus receives a dataset and a request to initiate an iterative algorithm (block 1005). In one embodiment, the iterative algorithm is a K-means clustering algorithm. In other embodiments, the iterative algorithm is any of various other types of algorithms (e.g., machine learning algorithms, stochastic gradient descent (SGD) algorithms). Next, the apparatus partitions the dataset into groups of data points corresponding to the nearest centroids (block 1010). For example, distances from each data point to each centroid are calculated, and each data point is grouped with the centroid to which the data point is the closest.

Next, the apparatus calculates the number of data points in each group (block 1015). Then, the apparatus calculates, for each group, the remainder when dividing the number of data points by the number of parallel processing lanes in the parallel processor of the apparatus (block 1020). For example, if the number of data points in a given group is 65, and the number of parallel processing lanes is 64, then the remainder would be 1. If the number of data points in another group is 81, and the number of parallel processing lanes is 64, then the remainder would be 17.

Next, the apparatus determines if the remainder of any group is less than a threshold percentage of the number of parallel processing lanes (conditional block 1025). For example, if there are 64 parallel processing lanes, then the threshold is 32 in one embodiment. In other embodiments, the threshold is 20, 16, 8, or other numbers. The threshold is set so as to reduce the inefficiency of using only a small percentage of the parallel processing lanes. For example, if the remainder for a given group is 1, then when the last data point is processed for the given group, only a single processing lane will be utilized and all of the other processing lanes will be idle, reducing the efficiency of the parallel processor.

If the remainders of all of the groups are greater than the threshold percentage of the number of parallel processing lanes (conditional block 1025, "no" leg), then the apparatus calculates a new set of centroids based on the data points closest to each centroid from the initial partition (block 1040). If the remainder of any group is less than a threshold percentage of the number of parallel processing lanes (conditional block 1025, "yes" leg), then the apparatus identifies one or more preferred candidate groups for receiving data points reassigned from this group (block 1030). The group with a remainder which is less than a threshold percentage of the number of parallel processing lanes is referred to as the first group for the remainder of this discussion. In one embodiment, a preferred candidate group is a group with a remainder which is relatively close to the parallel processing lane number. In other words, a preferred candidate group is a group with a remainder which is greater than a threshold percentage of the number of parallel processing lanes. For example, if a given group has a remainder of 57 and there are 64 lanes, then this given group would be more efficient on computations performed on the last set of data points if any number of data points up to 7 are reassigned to this given group. In some embodiments, the apparatus identifies multiple preferred candidate groups for reassigning data points in block 1030. For example, if the first group has 10 extra data points corresponding to a remainder of 10, and a first preferred candidate group needs 7 data points to fill its last set of data points to match the number of parallel processing lanes, then a second preferred candidate group is identified that can absorb the remaining 3 data points from the first group.

After block 1030, the apparatus reassigns a number of data points equal to the remainder from the first group to the one or more preferred candidate groups (block 1035). It is noted that block 1035 is performed for multiple groups which were identified in conditional block 1025 as having a remainder which is less than a threshold percentage of the number of parallel processing lanes. It is noted that reassigning data points from the first group to the preferred candidate group will introduce an error into the iterative algorithm. However, introducing a small error in the early iterations of the algorithm will not prevent the algorithm from converging in later iterations.

Next, the apparatus calculates a new set of centroids based on the data points closest to each centroid from the initial partition and any data points reassigned to one or more centroids (block 1040). After block 1040, the apparatus performs another iteration of the algorithm by returning to block 1010 and partitioning the dataset into groups of data points corresponding to the new centroids. Method 1000 is performed for any number of iterations until the algorithm converges and a solution is generated.

Figure 11:
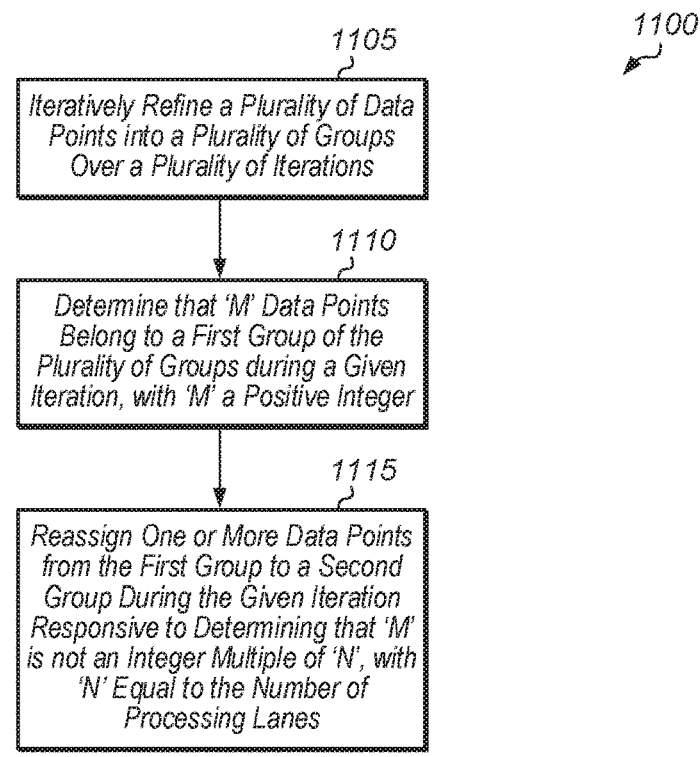
FIG. 11 is a generalized flow diagram illustrating one embodiment of a method for adjusting a number of data points in a first group to match the parallel processing lane number.

Referring now to FIG. 11, one embodiment of a method 1100 for adjusting a number of data points in a first group to match the parallel processing lane number is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1100.

An apparatus iteratively refines a plurality of data points into a plurality of groups over a plurality of iterations (block 1105). The apparatus includes a processor with a plurality of 'N' processing lanes configured to execute instructions in parallel, with 'N' a positive integer greater than one. During a given iteration, the apparatus determines that 'M' data points belong to a first group of the plurality of groups, with 'M' a positive integer (block 1110). Next, the apparatus reassigns one or more data points from the first group to a second group during the given iteration responsive to determining that 'M' is not an integer multiple of 'N' (block 1115). After block 1115, method 1100 ends. It is noted that blocks 1110 and 1115 are performed for any number of groups and during any number of iterations of the plurality of iterations.

Figure 12:
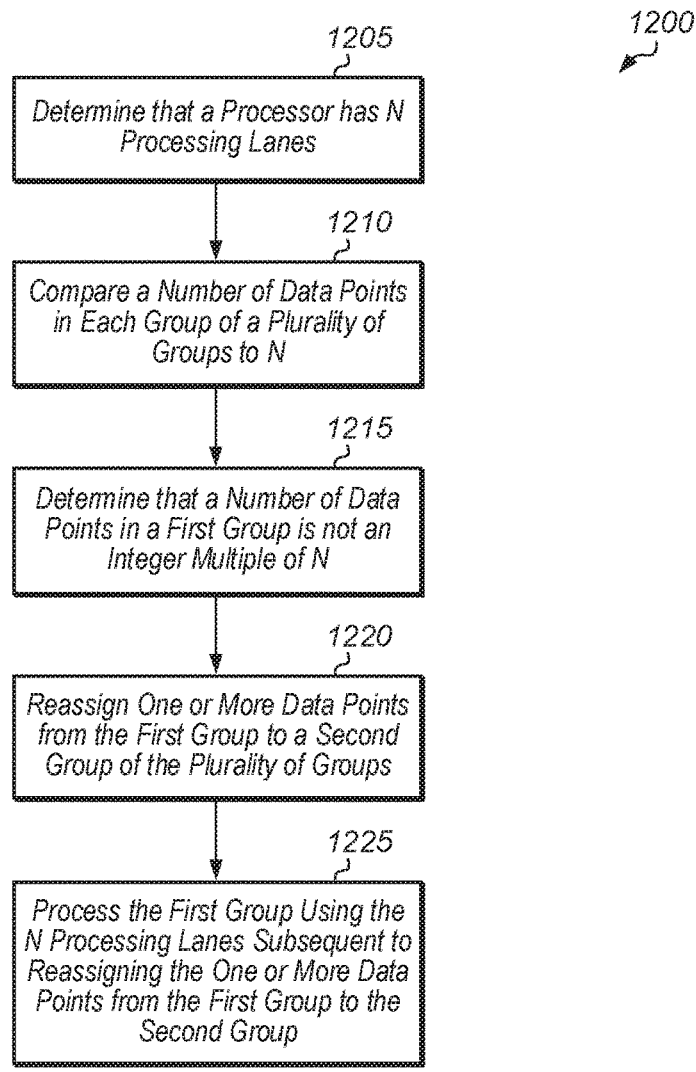
FIG. 12 is a generalized flow diagram illustrating one embodiment of a method for reassigning data points between groups.

Turning now to FIG. 12, one embodiment of a method 1200 for reassigning data points between groups is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1200.

A system determines that a processor has N processing lanes, wherein N is an integer greater than one (block 1205). In one embodiment, the system determines that the processor has N processing lanes by reading a register (e.g., lane width register 230 of FIG. 2) storing a lane width of the processor. Next, the system compares a number of data points in each group of a plurality of groups to N (block 1210). In response to comparing the number of data points in each group of a plurality of groups to N, the system determines that a number of data points in a first group is not an integer multiple of N (block 1215). In response to determining that the number of data points in the first group is not an integer multiple of N, the system reassigns one or more data points from the first group to a second group of the plurality of groups (block 1220).

Next, the system processes the first group using the N processing lanes subsequent to reassigning the one or more data points from the first group to the second group (block 1225). In one embodiment, the system processes the first group using the N processing lanes to perform a machine learning algorithm (e.g., K-means algorithm). After reassigning the one or more data points from the first group to a second group, the first group has a number of data points that can be more efficiently processed on the processor with N processing lanes. In one embodiment, the processor is configured to process data points of only a single group in a given clock cycle on the N processing lanes. After 1225, method 1200 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a processor with N processing lanes configured to execute instructions in parallel, where N is an integer greater than one; and
a memory;
wherein the system is configured to:
   determine that the processor has N processing lanes;
   compare a number of data points in each group of a plurality of groups to N;
   determine that a number of data points in a first group is not an integer multiple of N;
   reassign one or more data points from the first group to a second group of the plurality of groups responsive to determining that the number of data points in the first group is not an integer multiple of N; and
   process the first group using the N processing lanes subsequent to reassigning the one or more data points from the first group to the second group.

2. The system as recited in claim 1, wherein the processor is configured to process data points of only a single group in parallel on a plurality of the N processing lanes in a given clock cycle.

3. The system as recited in claim 1, wherein the system is configured to:
calculate a distance from a plurality of data points in the plurality of groups to each centroid of a plurality of centroids; and
assign a data point to a group corresponding to a given centroid responsive to determining that the data point is closer to the given centroid than to any other centroids of the plurality of centroids.

4. The system as recited in claim 1, wherein after reassigning the one or more data points from the first group to the second group, the first group has P data points, where P is an integer multiple of N.

5. The system as recited in claim 1, wherein:
prior to reassigning the one or more data points from the first group to the second group, the first group has M data points, where M is a positive integer greater than one;
the system is configured to reassign one or more data points from the first group to the second group responsive to determining that a remainder is less than a threshold percentage of N; and
the remainder is generated by dividing N by M.

6. The system as recited in claim 1, wherein:
the second group has P data points prior to being reassigned the one or more data points from the first group;
the system is configured to choose the second group for reassigning the one or more data points responsive to determining that a remainder is greater than a threshold percentage of N;
the remainder is generated by dividing N by P; and
P is a positive integer.

7. The system as recited in claim 1, wherein the system is configured to choose the one or more data points for reassigning from the first group to the second group based on a proximity of the one or more data points to a centroid of the second group.

8. A method comprising:
determining that a processor has N processing lanes, where N is an integer greater than one;
comparing a number of data points in each group of a plurality of groups to N;
determining that a number of data points in a first group is not an integer multiple of N;
reassigning one or more data points from the first group to a second group of the plurality of groups responsive to determining that the number of data points in the first group is not an integer multiple of N; and
processing the first group using the N processing lanes subsequent to reassigning the one or more data points from the first group to the second group.

9. The method as recited in claim 8, wherein the processor is configured to process data points of only a single group in parallel on a plurality of the N processing lanes in a given clock cycle.

10. The method as recited in claim 8, further comprising:
calculating a distance from a plurality of data points to each centroid of a plurality of centroids; and
assigning a data point to a group corresponding to a given centroid responsive to determining that the data point is closer to the given centroid than to any other centroids of the plurality of centroids.

11. The method as recited in claim 8, wherein after reassigning the one or more data points to the second group, the first group has P data points, where P is an integer multiple of N.

12. The method as recited in claim 8, wherein prior to reassigning the one or more data points from the first group to the second group the first group has M data points, and wherein the method further comprising reassigning one or more data points from the first group to the second group responsive to determining that a remainder is less than a threshold percentage of N, wherein the remainder is generated from dividing N by M.

13. The method as recited in claim 8, further comprising choosing the second group for reassigning the one or more data points responsive to determining that a remainder is greater than a threshold percentage of N, wherein the remainder is generated from dividing N by P, wherein the second group has P data points prior to being reassigned the one or more data points from the first group, and where P is a positive integer.

14. The method as recited in claim 8, further comprising choosing one or more data points for reassigning from the first group to the second group based on a proximity of the one or more data points to a centroid of the second group.

15. A non-transitory computer readable storage medium storing program instructions, wherein the program instructions are executable by a processor to:
determine that the processor has N processing lanes, where N is an integer greater than one;
compare a number of data points in each group of a plurality of groups to N;
determine that a number of data points in a first group is not an integer multiple of N;
reassign one or more data points from the first group to a second group of the plurality of groups responsive to determining that the number of data points in the first group is not an integer multiple of N; and
process the first group using the N processing lanes subsequent to reassigning the one or more data points from the first group to the second group.

16. The non-transitory computer readable storage medium as recited in claim 15, wherein the processor is configured to process data points of only a single group in parallel on a plurality of the N processing lanes in a given clock cycle.

17. The non-transitory computer readable storage medium as recited in claim 15, wherein the program instructions are further executable by a processor to:
calculate a distance from a plurality of data points to each centroid of a plurality of centroids; and
assign a data point to a group corresponding to a given centroid responsive to determining that the data point is closer to the given centroid than to any other centroids of the plurality of centroids.

18. The non-transitory computer readable storage medium as recited in claim 15, wherein after reassigning the one or more data points to the second group, the first group has P data points, where P is an integer multiple of N.

19. The non-transitory computer readable storage medium as recited in claim 15, wherein prior to reassigning the one or more data points from the first group to the second group, the first group has M data points, where M is an integer greater than one, wherein the program instructions are further executable by a processor to reassign one or more data points from the first group to the second group responsive to determining that a remainder is less than a threshold percentage of N, wherein the remainder is generated from dividing N by M.

20. The non-transitory computer readable storage medium as recited in claim 15, wherein the program instructions are further executable by a processor to choose the second group for reassigning the one or more data points responsive to determining that a remainder is greater than a threshold percentage of N, wherein the remainder is generated from dividing N by P, wherein the second group has P data points prior to being reassigned the one or more data points from the first group, and where P is a positive integer.

* * * * *